A. UPSON.

Seed Planter.

No. 54,042.

Patented Apr. 17, 1866.

Witnesses:
A. W. McClelland
J. Holmes

Inventor:
Alvah Upson

UNITED STATES PATENT OFFICE.

ALVAH UPSON, OF RANDOLPH, OHIO.

IMPROVEMENT IN CORN-PLANTERS.

Specification forming part of Letters Patent No. 54,042, dated April 17, 1866.

*To all whom it may concern:*

Be it known that I, ALVAH UPSON, of Randolph, in the county of Portage and State of Ohio, have invented certain new and useful Improvements in a Machine for Planting Corn, &c.; and I do hereby declare that the following is a full and complete description of the construction and operation of the same, reference being had to the accompanying drawings, making a part of this specification, in which—

Figure 1:
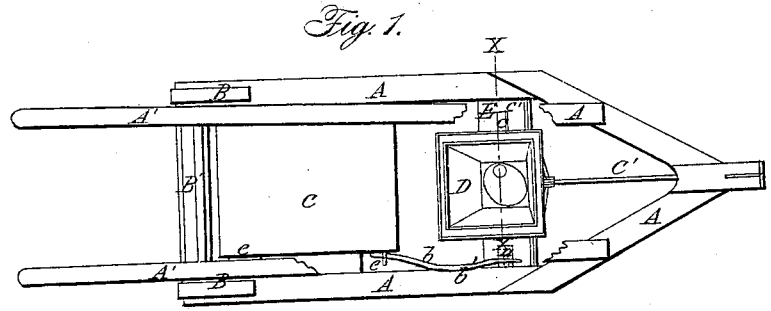
Figure 4:
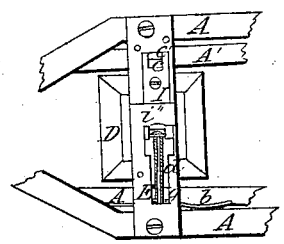
Figure 5:
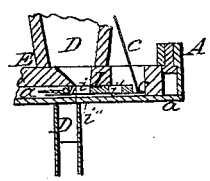
Figure 2:
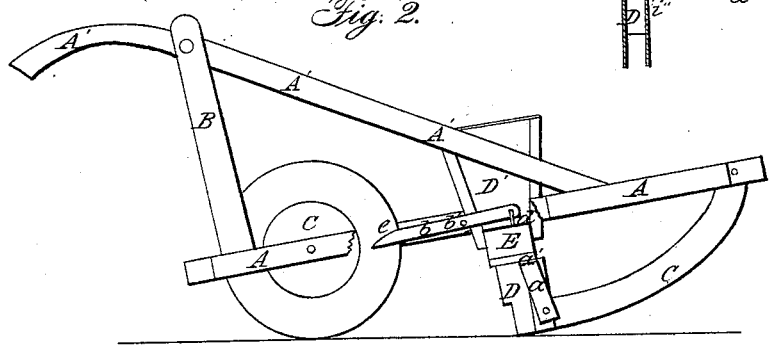
Figure 3:
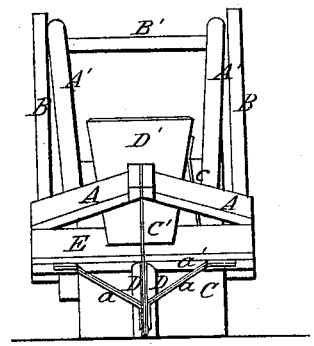

Figure 1 is a top view of the machine. Fig. 2 is a side view. Fig. 3 is a front view. Figs. 4 and 5 are detached sections, that will be referred to in the description.

Like letters of reference refer to like parts in the several views.

My improvement relates to a machine for planting corn, &c., as hereinafter described.

A represents the frame shown in the drawings at the front end of which are attached handles A', that extend back and are supported by standards B. At the rear end of the frame B' is a brace between the handles.

The roller C is connected to the frame by a shaft and journal in the ordinary way.

To the front of the frame is secured the curved cutter or arm C', to the other end of which is attached a vertical spout, D, for the purpose of conveying the corn or seed from the hopper D' into the earth. The spout is retained in place by means of the braces $a$, (seen in Figs. 2 and 3,) that are attached to the cover $a'$ of the case E.

Fig. 4 shows the under side of the case E with the cover removed, and Fig. 5 is a cross-section of the case in the direction of the lines $x\ x$ in Fig. 1.

The handles A' (seen in Fig. 1) are broken away, showing the lever $b$ and spring $c$.

When the machine is in motion one of the pins, $e$, on the roller will come against one end of the lever $b$, (seen in Fig. 1, and also in Fig. 2,) the frame A being broken away. This lever is pivoted to the frame at $b'$.

When the pin $e$ comes against the lever it depresses that end and raises the other, which moves the slide I, that is connected to the lever by a cord, $d$, seen in Figs. 4 and 5, which cord passes under a roller, $g$, and when the pin slips off the lever as the roller turns round the spring $c$ presses against the spring $c'$ in the slide, forcing it back in place.

After the corn is put into the hopper D' it passes down into the chamber $i$ in the slide, where it is held by means of the piece $i''$. The slide being then moved along by the lever, as before stated, the corn will fall and pass through the opening in the cover, out through the spout D, into the ground.

The distance of the corn to be planted or the hills apart can be gaged by the number of pins on the roller. The more there are the nearer together the rows will be, and the fewer, the farther apart.

The slide I has two chambers, $i$ and $i'$, the chamber $i'$ being the smallest. If a greater quantity of corn is to be planted the larger one is to be used, as shown; but if a smaller, the chamber $i'$, by taking the slide out and putting the cord around the pin $c'$ and the spring against the pin in the other end of the slide. In using the larger chamber it can be moved part way under the hopper, and take a smaller portion of the corn or seed.

If it is desired to plant seed in a continuous row, the spring $c$ and lever $b$ can be disconnected and the slide moved along, leaving an opening from the hopper to the spout in proportion to the quantity of the seed desired to be sown.

The cutter or arm C' is for the purpose of cutting or breaking the ground and in earth that has not been plowed or greensward, forming a channel into which the seeds will fall; and if any stones, sticks, &c., are in the way it will throw them aside and the roller following will cover the corn after it is deposited. When it is desired to use the roller without the planting apparatus, the pin $b'$ can be removed and the lever moved back until it is free from the pin on the roller, and then the pin $b'$ can be inserted into a hole for that purpose, which will keep the lever in place.

In case the circumference of the roller C is four feet, one pin inside of the roller will drop the seed in hills four feet apart; two pins will make the hills two feet; four pins, one foot, and so on, in the same ratio, until they can be four or six inches apart, if desirable; and if one wishes to plant rows both ways, or check-row it, only one pin will be used. Start from a given line at each end of the field. Before starting turn the roller $c$ so that the pin will touch the lever $b$ when the slide I is directly over the line at the starting-point at each end, and if the ground is not very stony or uneven the rows will be four feet apart each way.

What I claim as my improvement, and desire to secure by Letters Patent, is—

The cutter C', spout D, and slide I, in combination with the spring c, cord d, lever b, and roller C, arranged and operating in the manner and for the purpose set forth, constituting a self-dropper.

ALVAH UPSON.

Witnesses:
W. H. BURRIDGE,
J. HOLMES.